(12) United States Patent
Tuman et al.

(10) Patent No.: US 6,962,635 B2
(45) Date of Patent: Nov. 8, 2005

(54) METHOD FOR MAKING A STEM WEB

(75) Inventors: Scott J. Tuman, Woodbury, MN (US); David L. Seidel, Woodbury, MN (US); Leon Levitt, Mendota Heights, MN (US); Brandon T. Berg, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/821,669

(22) Filed: Mar. 29, 2001

(65) Prior Publication Data

US 2001/0018110 A1 Aug. 30, 2001

Related U.S. Application Data

(62) Division of application No. 09/257,447, filed on Feb. 25, 1999, now abandoned.

(51) Int. Cl.[7] .......................... B32B 31/10; B32B 31/16
(52) U.S. Cl. ............... 156/66; 156/244.11; 156/244.25; 156/245; 156/229; 156/256; 156/257; 156/265; 156/297
(58) Field of Search ................................ 156/196, 199, 156/229, 242, 244.11, 244.25, 297, 298, 299, 302, 245, 256, 257, 265, 221, 66, FOR 244.24, FOR 66; 428/77, 78, 99, 100, 189, 190; 264/167, 171, 211, 212, 214, 248, 251, 252, 279, 211.12, 331.11, 135; 24/403, 404; 118/40

(56) References Cited

U.S. PATENT DOCUMENTS

| | | | | |
|---|---|---|---|---|
| 2,297,245 A | * | 9/1942 | Püchuer et al. ................ | 24/403 |
| 2,731,671 A | * | 1/1956 | Zimmerman ................ | 264/135 |
| 4,056,593 A | | 11/1977 | De Navas Albareda | |
| 4,290,174 A | | 9/1981 | Kalleberg | |
| 4,714,096 A | | 12/1987 | Guay | |

(Continued)

FOREIGN PATENT DOCUMENTS

| | | | | |
|---|---|---|---|---|
| EP | 233364 A1 | * | 8/1987 | ............ D04B/1/04 |
| JP | 8-187113 | | 7/1996 | |
| JP | 8-214917 | | 8/1996 | |
| WO | WO 93/20976 A1 | | 10/1993 | |
| WO | WO 95/03723 | | 2/1995 | |
| WO | WO 9604812 A1 | * | 2/1996 | ............ A44B/00/00 |
| WO | WO 99/17630 A1 | | 4/1999 | |

OTHER PUBLICATIONS

Product Reference Guide, Tapeless™ Technologies, Inc., 1998 (2 pgs).

J&M Laboratories, "Hot Melt Adhesive Systems", brochure, 1998.

*Primary Examiner*—Gladys JP Corcoran
(74) *Attorney, Agent, or Firm*—William J. Bond

(57) ABSTRACT

Method for making a stem web material having a plurality of stems extending from discrete regions (patches or stripes) of the web, comprising:
a) providing a web (e.g. nonwoven, woven or knit textile fabric; paper; microporous membrane, polymer film; etc.);
b) providing discrete quantities of a polymer at a temperature above its softening point or in molten state;
c) fusing the discrete quantities of polymer to the web; and
d) forming a plurality of stems in each of the discrete quantities of polymer material.

The stems can be formed by pressing the web on which the patches or stripes of polymer are deposited against a tool having a surface with a plurality of stem-forming holes. The stems can be given enlarged ends by bringing the surface of the stem web close to a heated surface.

40 Claims, 5 Drawing Sheets

U.S. PATENT DOCUMENTS

| | | | |
|---|---|---|---|
| 4,732,631 A | | 3/1988 | Shimizu |
| 4,732,800 A | | 3/1988 | Groshens |
| 4,872,243 A | | 10/1989 | Fischer |
| 4,894,060 A | | 1/1990 | Nestegard |
| 4,959,265 A | | 9/1990 | Wood et al. |
| 5,077,870 A | * | 1/1992 | Melbye et al. ............... 24/452 |
| 5,256,231 A | | 10/1993 | Gorman et al. |
| 5,260,015 A | | 11/1993 | Kennedy et al. |
| 5,315,740 A | | 5/1994 | Provost |
| 5,326,415 A | | 7/1994 | Thomas et al. |
| 5,374,262 A | | 12/1994 | Keuhn, Jr. et al. |
| 5,393,475 A | | 2/1995 | Murasaki et al. |
| 5,456,660 A | | 10/1995 | Reich et al. |
| 5,505,747 A | | 4/1996 | Chesley et al. |
| 5,547,531 A | | 8/1996 | Allen et al. |
| 5,586,371 A | | 12/1996 | Thomas |
| 5,611,122 A | | 3/1997 | Torigoe et al. |
| 5,643,651 A | | 7/1997 | Murasaki |
| 5,669,120 A | | 9/1997 | Wessels et al. |
| 5,679,302 A | | 10/1997 | Miller et al. |
| 5,792,411 A | | 8/1998 | Morris et al. |
| 5,989,204 A | | 11/1999 | Lina |
| 6,080,347 A | * | 6/2000 | Goulait ....................... 264/167 |
| 6,106,022 A | | 8/2000 | Badash et al. |
| 6,205,623 B1 | | 3/2001 | Shepard et al. |
| 6,692,674 B1 | * | 2/2004 | Kurtz et al. ................ 264/167 |
| 6,730,069 B2 | * | 5/2004 | Tanzer et al. ............... 604/391 |
| 6,783,622 B1 | * | 8/2004 | Backlund et al. ........... 156/250 |
| 6,878,332 B2 | * | 4/2005 | Tachauer et al. ............ 264/471 |
| 2002/0022108 A1 | * | 2/2002 | Krantz et al. ............... 428/100 |
| 2003/0034583 A1 | * | 2/2003 | Provost ...................... 264/146 |

\* cited by examiner

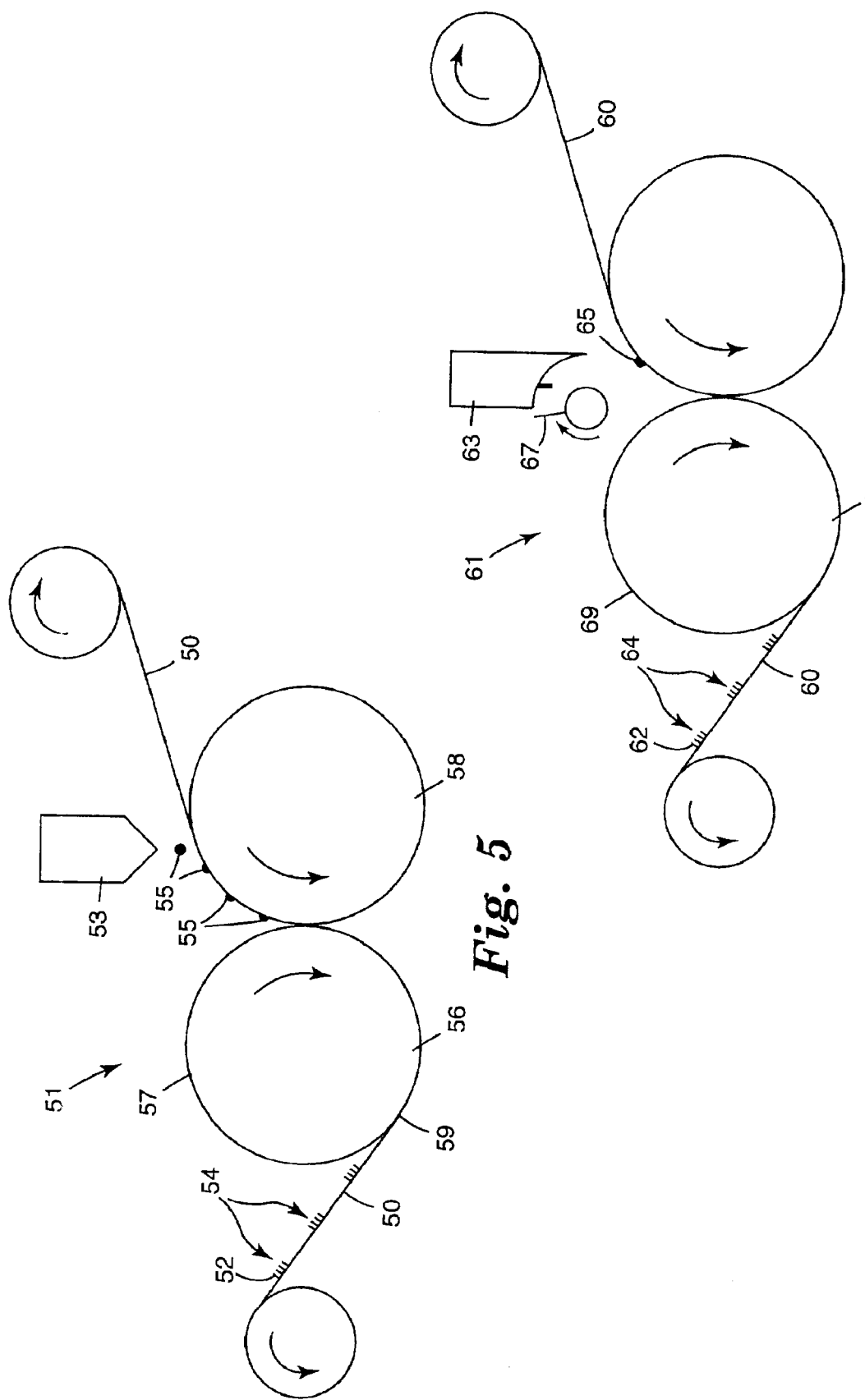

METHOD FOR MAKING A STEM WEB

This is a divisional of application Ser. No. 09/257,447 filed Feb. 25, 1999, now abandoned.

TECHNICAL FIELD

The present invention is directed to stemmed web constructions useful as mechanical fasteners. More particularly, the invention relates to web constructions having discrete regions of stems, and methods of making the same.

BACKGROUND OF THE INVENTION

Stemmed webs, such as hook and loop fasteners, have been in use for a number of years. These webs typically include stems that are secured to the web. The stems are commonly formed into hooks configured to interlock with a loop material. In this description, small protrusions capable of engaging small loops or mesh of, for example, fabric or polymer will be referred to as hooks whether they are actually in the shape of hooks or other shapes. A common form of hook is mushroom-shaped and can also be used as a mechanical fastener to engage other hooks.

U.S. Pat. Nos. 4,056,593, 4,959,265, and 5,077,870 disclose methods of forming polymeric stemmed webs. In these patents, a thermoplastic resin is extruded into a tool having an array of cavities. Upon separation from the tool, the thermoplastic resin forms an array of stems. The stems are subsequently calendered to produce a broader head at the top of the stems. The shape, dimensions, and angularity of the heads and the stem density determine the ease of capture and tenacity of hold of the loop. Similarly, U.S. Pat. No. 5,393,475 discloses a method of making a stemmed web with stems on both sides of the web. This patent discloses extruding two different materials to form two base portions and forming hooks by allowing the material to fill cavities on two rollers between which the materials pass.

Although these patents disclose acceptable stemmed webs, they may not be readily adapted to meet different applications and purposes.

SUMMARY OF THE INVENTION

The present invention relates to a web of material having at least two major sides. The web includes a plurality of discrete regions on at least a first major side, with a plurality of stems extending from each discrete region. The plurality of stems are fused and formed to at least the first major side of the web. The stems can be configured for use as a mechanical fastener, and may have one or more different configurations and orientations. For example, the stems may have a hook formation suitable for interlocking with another hook or with a loop. Alternatively, the stems may be substantially mushroom-shaped. The stems may be oriented perpendicular to the web, or may be oriented at an angle of less than 90 degrees to the web. In one embodiment, the web defines a localized plane, and the plurality of stems are oriented at multiple angles to the localized plane. At such angles, the stems provide an improved mechanical fastening effect when a force is applied parallel to the localized plane and against the angled stems. In certain embodiments, at least a portion of the web is configured and arranged to engage the plurality of stems.

The plurality of stems can be formed of any polymer or mixture of polymers that can flow into the cavities in a stem forming tool (described hereinafter) and quench or solidify before the web is pulled away from the tool. Useful polymers are typically thermoplastic materials, including polyurethane, polyolefins (e.g., polypropylene and polyethylene), polystyrenes, polycarbonates, polyesters, polymethacrylate, ethylene vinyl acetate copolymers, ethylene vinyl alcohol copolymers, polyvinylchloride, acrylate modified ethylene vinyl acetate polymers, and ethylene acrylic acid copolymers. The web may include at least one elastic material, such as natural and synthetic rubbers; styrene block copolymers containing isoprene, butadiene, or ethylene(butylene) blocks; metallocene-catalyzed polyolefins, polyurethanes, and polydiorganosiloxanes. Alternatively, the web may be of the same polymer as the stems or may be a loop material such as woven or nonwoven material.

The invention is further directed to a method of making a web having a plurality of stems extending from discrete regions or patches on the web. The method includes providing a web and discrete quantities of a polymeric material in a softened state. The discrete quantities of polymeric material are fused to the web, and a plurality of stems are formed in each discrete fused quantity of polymeric material. The discrete quantities or patches of polymeric material may be fused to the web at substantially the same time that the stems are formed. The discrete quantities of polymeric material may be provided by extruding intermittent quantities of molten polymer onto the web in forms ranging from dots to cross-web stripes. Alternatively, the discrete quantities of polymeric material may be provided by one or more rotating cutting blades.

Another embodiment of the invention comprises making a web having discrete regions of stems in the form of continuous stripes or ribbons. In this embodiment, the discrete regions may be arranged in continuous stripes that extend in a down-web direction in straight or zigzag patterns. In between the stripes are parts of the web surface without stems.

In yet another embodiment, the inventive method includes providing a polymeric web and a tool having a surface with a plurality of stem-forming holes or cavities arranged in discrete regions. Part of the total surface area of the tool has such holes arranged in discrete regions while there are parts of the surface, in between regions occupied by holes, that are smooth. Alternatively, if the total surface is occupied by holes, a portion of the stem-forming cavities is masked. The web, bearing a quantity of polymeric material in excess of the amount that would fill the cavities, is pressed against the tool surface under pressure to form regions or patches of stems on the surface of the web. Each patch is bonded to the web.

Other features and advantages of the invention will be apparent from the following detailed description of the invention and the claims. The above summary of principles of the disclosure is not intended to describe each illustrated embodiment or every implementation of the present disclosure. The figures and the detailed description that follow more particularly exemplify certain preferred embodiments utilizing the principles disclosed herein.

BRIEF DESCRIPTION OF THE DRAWINGS

FIG. 5 is a schematic diagram of an apparatus for use in a first method of making a stemmed web using a dot coater to distribute stem-forming material onto a web.

FIG. 6 is a schematic diagram of an apparatus for use in a second method of making a stemmed web using a knife cutter to distribute stem-forming material onto a web.

DETAILED DESCRIPTION OF THE INVENTION

At least one of the major sides of the inventive web has a plurality of discrete patches or regions from which protrude a multiplicity of stems. In between the patches or regions are intermediate discrete regions or inter-regions that contain few, if any, stems.

Figure 1:
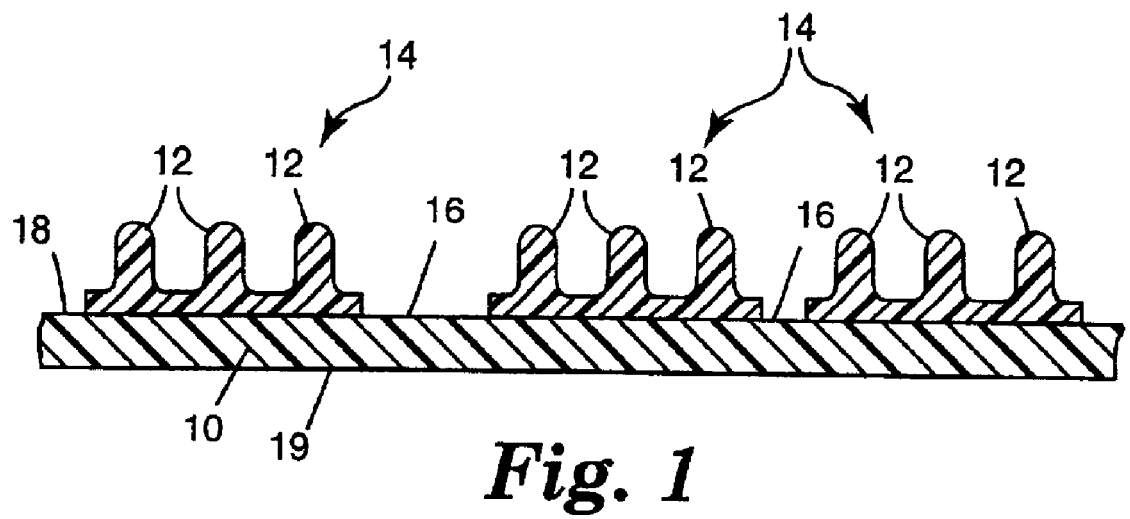
FIG. 1 is a cross-sectional side view of a plurality of regions of stems configured and arranged in accordance with an embodiment of the invention.

FIG. 1 shows a web 10 having stems 12 arranged in numerous discrete patches or regions 14 on web surface 18. The discrete patches or regions 14 of stems 12 are separated from one another by inter-regions 16. The stems 12 are protrusions extending from web 10, and web 10 is a substrate that may be configured for the formation and holding of the stems 12. In FIG. 1, regions 14 are connected to one another only by web 10. Thus, inter-regions 16 reveal exposed portions of web 10, unobstructed by any of the thermoplastic material used to form stems 12.

In FIG. 1, the stems 12 are positioned on only an upper surface 18 of web 10, and are not positioned on a lower surface 19. It will be appreciated, however, that stems 12 can be positioned on either or both the upper and lower surfaces 18, 19 in various embodiments of the invention. Also, stems 12 can be formed such that they are a useful component of a mechanical fastener. For example, the stems 12 may be hooks for use with hook and loop fasteners. Alternatively, the stems 12 can be formed into mushroom-shaped mechanical fasteners. In still other embodiments of the invention, the stems 12 can be oriented at one or more angles to the localized plane defined by web 10.

In specific embodiments of the invention, the discrete regions 14 cover between 20 and 80 percent of the surface of the web 10 on which they are positioned. In other embodiments, the discrete regions 14 cover between 1 and 99 percent, between 5 and 70 percent, between 10 and 50 percent, or between 5 and 25 percent of the surface of the web 10 on which they are positioned. The discrete regions 14 may be separated from one another by various distances. For example, the regions 14 may be separated by an average of approximately 0.05 and 30 centimeters; or by an average of between 1 and 4 centimeters. In certain embodiments, the distance between the regions 14 is identified as a multiple of the distance between stems, such as 10 times the distance between the center of adjacent stems. Thus, for example, when the stems in a region are 0.05 centimeters apart, the regions can be 0.5 centimeters apart. In other implementations, the stems are 2, 50, 300, or more times the distance between the center of the stems. In some embodiments, the regions 14 may be continuous in one direction such as ribbons running down-web in a zig-zag or straight line configuration.

The inter-regions 16 may include loop structures for locking with the stems 12, or may expose a portion of the web 10 that is unsuitable for locking with the stems 12. In implementations in which the web 10 itself contains loop structures, such as woven and non-woven fibers, then the inter-regions 16 may provide a location for locking the stems 12. In addition, the stems 12 can be configured to lock with the opposite side 19 of the web 10.

The web 10 is, for example, woven or non-woven, and may be a continuous film or composed of a multitude of fibers. The chosen web material will affect the properties of the final product, such as elasticity, flexibility, conformability, breathability, porosity, and stiffness. In certain embodiments, the web 10 is composed of fibers such as cellulose, nylon, polypropylene, or cotton. In other embodiments, the web is a single or multi layer film, such as a thermoplastic film. The web 10 is optionally constructed of an elastic material, such as natural and synthetic rubbers; styrene block copolymers containing isoprene, butadiene, or ethylene(butylene) blocks; metallocene-catalyzed polyolefins, polyurethanes, and polydiorganosiloxanes. Alternatively, the web 10 is a metallic sheet, or a composite of various fibers and films. Thus, it will be appreciated that the invention is suitable for uses that require a great number of flexible and inflexible web materials.

Figure 2:
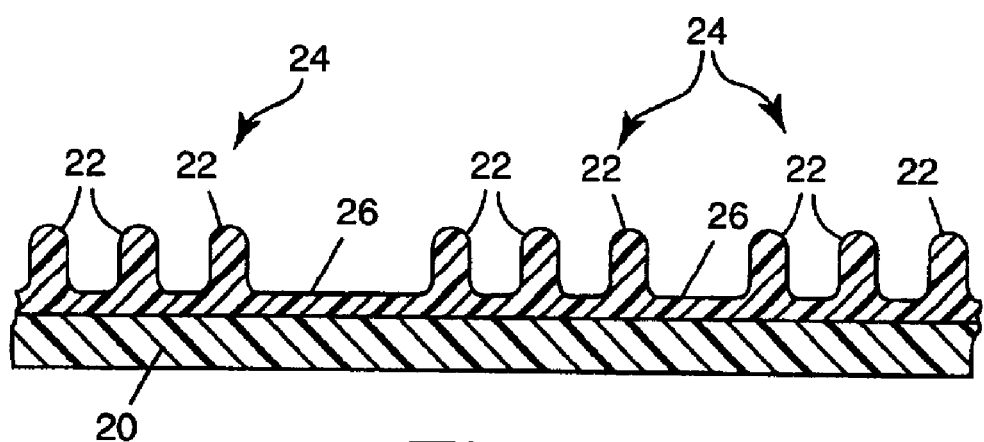
FIG. 2 is a cross-sectional side view of a plurality of regions of stems configured and arranged in accordance with another embodiment of the invention.

FIG. 2 shows a web 20 having stems 22. In contrast to FIG. 1, in FIG. 2 the thermoplastic material forming the stems 22 is continuous or substantially continuous between the regions 24, and web 20 and stems 22 may be of the same material. Thus, inter-regions 26 comprise a thin film of the thermoplastic material overlying the web 20. However, it will be noticed that in both FIG. 1 and FIG. 2, the inter-regions 16, 26 do not contain any stems. Even when the inter-regions 26 contain thermoplastic material, such as in FIG. 2, the inter-regions 26 preferably do not contain stems 22. In specific embodiments, the web 20 is elastic and the inter-regions 26 are sufficiently thin so that the inter-regions may be stretched and severed as the web 20 is stretched. In another embodiment, the web is a thermoplastic material in which a portion was reshaped into stems in discrete areas on at least one surface.

Figure 3:
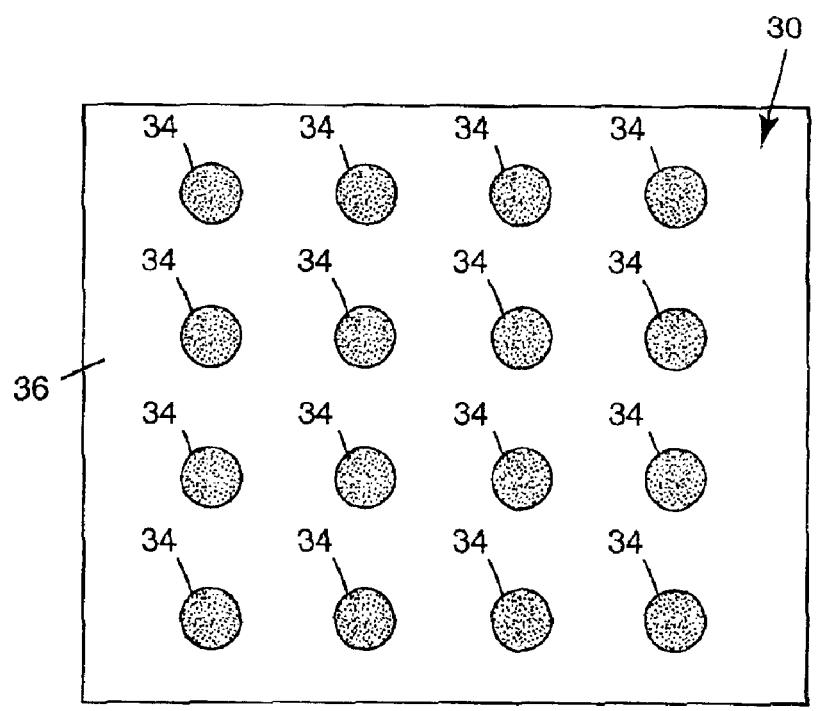
FIG. 3 is a top plan view of a plurality of regions of stems in accordance with yet another embodiment of the invention.
Figure 4:
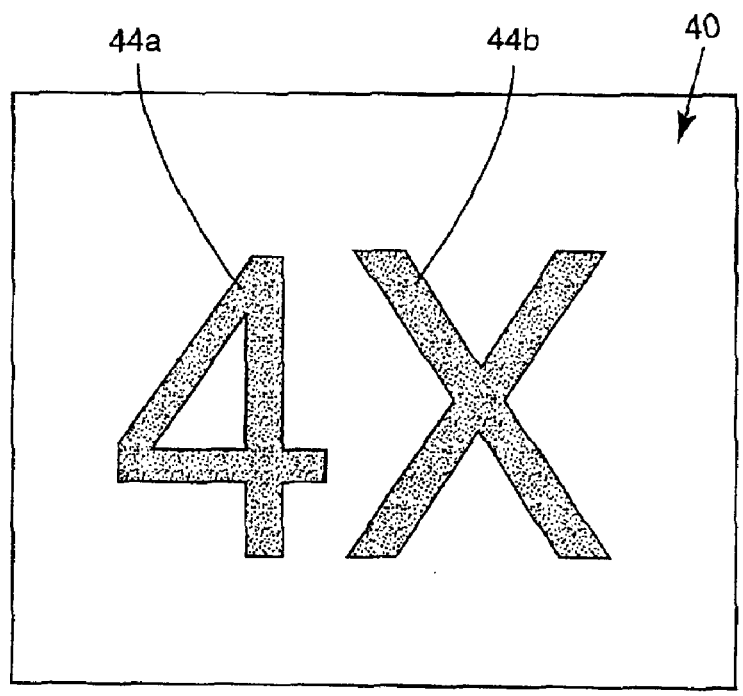
FIG. 4 is a top plan view of a plurality of regions of stems in accordance with yet another embodiment of the invention.

In FIGS. 3 and 4, two embodiments of the invention are shown in which the stems are positioned in distinct regions. In FIG. 3, the web 30 is shown with stems arranged in generally circular discrete regions 34 (individual stems are not shown). Each region 34 contains at least 3 stems, and preferably at least 10 stems, more preferably at least 50 stems. The inter-region 36 between the regions 34 does not contain any stems. In FIG. 4 the web 40 has stems arranged in distinct regions 44a, 44b, the regions having an ornamental configuration depicting the letters "4X".

In the inventive method, discrete quantities of the polymeric material may be provided by extruding intermittent quantities of molten polymer onto the web. The quantities are subsequently fused to the web and formed into stems. Alternatively, discrete quantities or spots of polymeric material may be provided by one or more rotating cutting blades. Additionally, the polymeric material may be provided as either bands or as continuous stripes that run across the major surface of the web.

Hooks can be formed in the stems by capping the stems to form mushroom heads as disclosed in U.S. Pat. No. 5,077,870, incorporated herein by reference, or by bending them. The tips of the stems are contacted with a heated surface to alter the shapes of the stems.

The stems may also be shaped to provide directional hooking capability. Such directional hooks may be used to give directional stability to a hook and loop fastening construction by providing fastening in a selected direction and releasing capability in the opposite direction. The directional stems can be made by pressing the polymeric material onto a tool having a plurality of holes that are angled or tilted in the same direction or in multiple directions arranged in various configurations down-web or cross-web. Stems can be tilted down-web and cross-web, and the patches or regions of stems can be arranged in rows down-web or cross-web or other configurations, such as hexagons, circles, or graphical patterns as shown in FIG. 4.

The holes in the tool can be formed with a laser and can be drilled at various angles such as, for example, 45° or 60°, with respect to the surface or tangent of the tool. The methodology of laser drilling of a thermoset tool is described in U.S. Pat. No. 5,792,411, incorporated herein by reference, and includes machining a tool surface with laser energy to produce a plurality of geometric structures in the substrate. Each of the geometric structures corresponds to a position in which a stem is formed. The stems formed by such a tool do not have to be capped to engage a loop surface since they are tilted. The resulting fastener surface with tilted stems permits the inventive web to be clinched tighter by pulling to release mechanical engagement of the stems and then releasing to achieve mechanical engagement. The stems may be angled in more than one direction. When the hooks are angled in more than one direction, the resulting mechanical engagement with a loop material is resistant to lateral slippage.

FIG. 5 shows a web 50 being manufactured on an apparatus 51. The apparatus 51 is used to make stems 52 on the web 50. The stems 52 are arranged in discrete patches or regions 54. Apparatus 51 includes a source 53 of polymeric material. The source 53 preferably heats the polymeric material to a melting point and then deposits the melted polymeric material on the web 50 as discrete portions 55. In the embodiment shown, source 53 includes an extruder that extrudes the polymeric material under pressure onto the web 50.

The discrete portions 55 move along the web 50 until they come in contact with tool roll 56. Tool roll 56 has a continuous cylindrical tooled surface 57 containing a plurality of cavities (not shown) configured to form the stems. These cavities are optionally evacuated by an external vacuum source (not shown). As the discrete portions 55 of polymeric material come in contact with surface 57 of the cylindrical tool roll 56, the portions 55 are simultaneously pressed into the cavities and fused to the web 50.

In the embodiment shown, a casting roll 58 provides pressure against the back side of the web 50 as the polymeric material cools, thereby assisting in pressing the polymeric material into the cavities in tooled surface 57 of tool roll 56 and fusing of the polymeric material to the web 50. The web 50 conforms to the tool roll 56 until release point 59 is reached, at which point the web 50 is pulled away from tooled surface 57 and the solidified polymeric material is stripped from the tool roll 56, exposing the newly formed stems 52.

In this embodiment, each discrete portion 55 of the polymeric material forms a separate distinct patch or region 54 of stems 52. The bond between the substrate 50 and patch or region 54 may be enhanced by adhesives, tie layers or surface treatment within the skill of the art.

It is within the skill of the art to select operable temperatures for the apparatus. In experiments leading to this invention, rolls 56 and 58 were not temperature controlled. A broad temperature range would be useful; although temperatures that are too high may adversely affect the capability of the stems to release from the tooled surface 57.

By varying the position and size of the polymeric portions 55, the final configuration and placement of the stems can be controlled and manipulated. Large polymeric portions correspond to large regions, and small polymeric portions correspond to small regions. In one embodiment of the invention, the source 53 deposits the polymeric portions 55 in continuous lines or stripes down the web, such as lines in a zigzag orientation. The resulting web 50 has one or more continuous bands of stems running along its length. In another embodiment, source 53 deposits the polymeric portions 55 in a series of cross-web lines. These cross-web lines result in regions 54 of stems 52 extending in cross-web bands along the length of the web.

The source 53 of polymeric material may include a plurality of separate nozzles for application of the polymeric material to the web. In one implementation, the polymeric material is extruded from a series of nozzles controlled by solenoid valves, each nozzle being independently operated. Depending upon the desired final position of the regions of stems, individual nozzles are turned on and off, for example by a timer, in order to properly place the polymeric material. It will be appreciated that the nozzles can deposit one or more than one type of polymeric material. Source 53 may also be a screen printer.

Referring to FIG. 6, another method is shown for making discrete regions of stems. FIG. 6 shows a web 60 being manufactured on an apparatus 61 similar to that shown in FIG. 5. Apparatus 61 includes a source 63 of polymeric material. The source 63 releases polymeric material into the path of a revolving blade 67. The blade 67 cuts and disperses the polymeric material onto the web 60. In a specific embodiment, the blade 67 is between 1 and 4 inches long and revolves at between 500 and 1000 rotations per minute. The revolving blade 67 cuts the polymeric material, which is deposited onto the web 60 and subsequently formed into a plurality of stems 62. The polymeric material may be dispersed as generally round particles, long strands, or numerous other shapes and sizes depending upon the blade speed, polymeric material viscosity, and other properties. The polymeric material moves along the web 60 as discrete portions 65 until it comes in contact with toot roll 66. Tool roll 66 has a continuous cylindrical tool surface 69 containing a plurality of cavities (not shown) configured to form the stems 62 in regions 64. As the discrete portions 65 of polymeric material come in contact with the tool roll 66, the portions 65 are simultaneously driven into the cavities and fused to the web 60, then cooled to a non-molten state.

Figure 7:
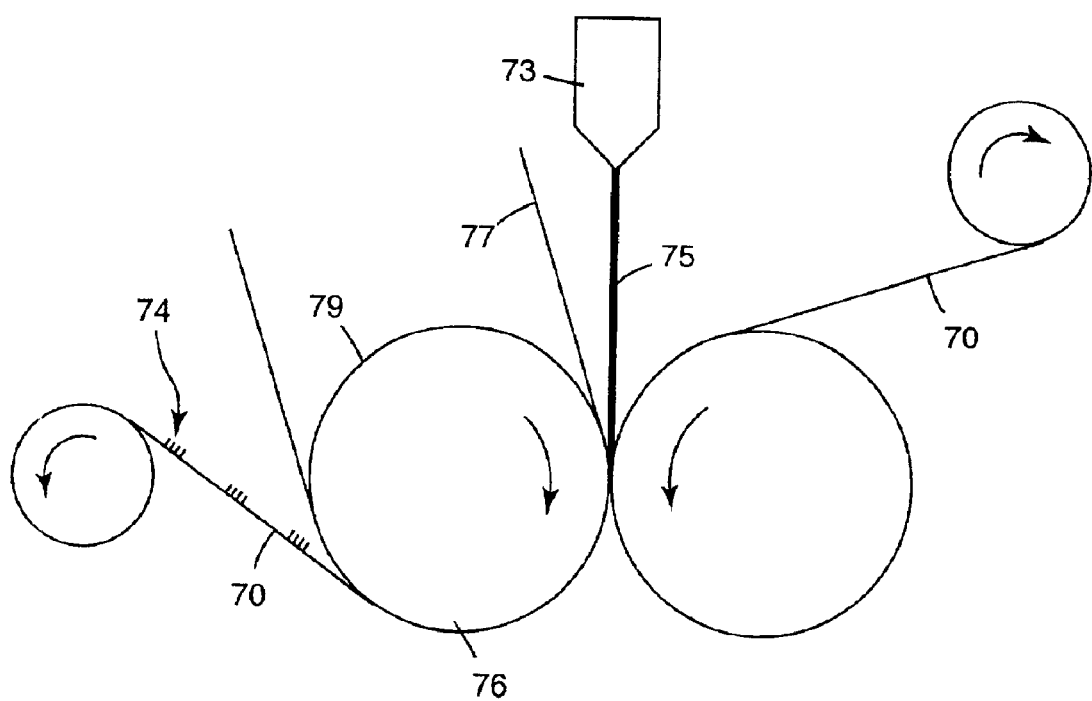
FIG. 7 is a schematic diagram of an apparatus for use in a third method of making a stemmed web in accordance with the invention, using a mask to distribute stem-forming material onto the web.

The method shown in FIG. 7 includes providing a polymeric web 70, a polymeric material from source 73, and a tool roll 76 having a tooled surface 79. The tooled surface 79 has a plurality of stem-forming holes. The tooled surface 79 of the tool roll 76 is covered with mask 77 that covers all but discrete portions of the surface 79. Polymeric material 75 is applied to the mask covered surface of tooled roll 76. Optionally, material 75 is applied to web 70 and pressed against mask covered tool surface 79 under pressure to form regions of stems on the surface of the web 70. These discrete portions correspond to the regions 74 of stems. Regions 74 form because only these areas come in contact with the masked surface of tool 76 in the nip between the two rollers to form the stems. Optionally, polymeric material 75 may be more than one layer.

The tips of the tilted stems, if not capped, are preferably sufficiently sharp to penetrate relatively dense loop materials, thus broadening the selection of loop materials. The inventive webs having tilted stems can be tightened or clinched by dragging the end of the web, instead of completely disengaging it from the mating or loop material.

The inventive webs may use less raw material for forming the stem or hook side, since the whole surface is not covered with hooks or stems. They may also have the advantages of gradient fastening (to tighten or loosen) and dual-sided web functionality both sides functional).

The stemmed webs of this invention can be used in virtually any application as other stemmed webs, and can find particular utility in the construction of compression wrap articles or bandages that can be used in orthopedic applications. For example, elastic fasteners can be used as elastic wraps to secure cables, orthopedic articles, diapers, athletic protective devices, clothing or packaging materials. Medical wraps or bandages can be made to possess the strength, elasticity, and fastening properties required for a particular application without the disadvantages associated with the use of cohesive and adhesive medical wraps and bandages. Cohesive and adhesive medical wraps typically do not allow for easy removal, and are difficult to adjust once they have been applied. For example, adhesive medical wraps can be difficult to either tighten or loosen once they have been applied to a patient.

Figure 8:
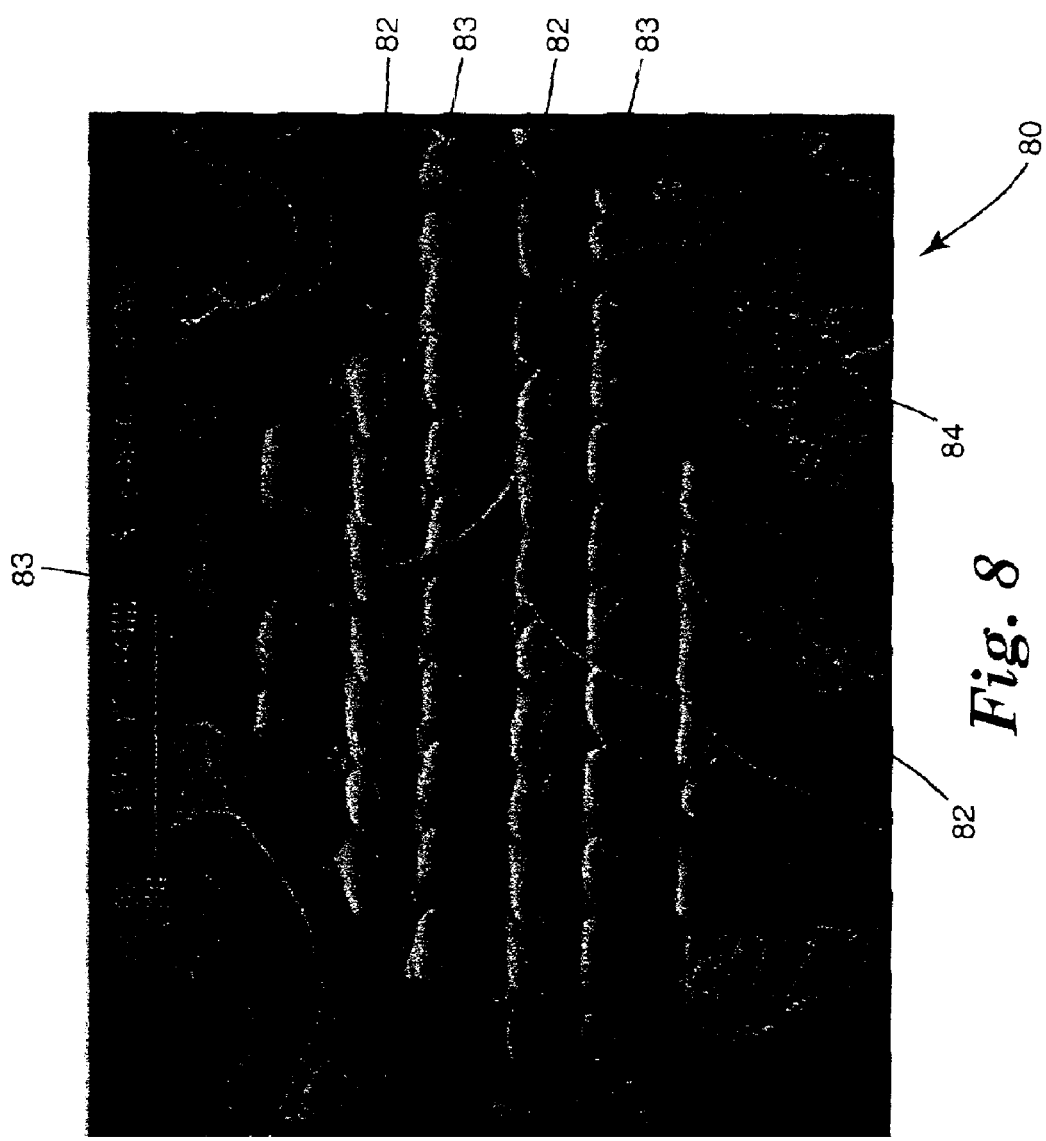
FIG. 8 is a photomicrograph of a region of stems configured and arranged in accordance with an implementation of the invention.

Referring to FIG. 8, a photomicrograph is depicted showing a portion of a web 80 having a patch or region 84 containing a plurality of stems 82, 83. As is apparent in FIG. 8, the stems of the embodiment shown are oriented or tilted substantially in two directions, with the stems 82 oriented opposite to the stems 83. The opposite orientation of the stems 82, 83 allow the region 84 to provide holding force in two different directions.

This invention is further illustrated by the following examples, which are not intended to limit the scope of the invention. In the examples, all parts, ratios and percentages are by weight unless otherwise indicated. The following test materials and methods were used:

Materials Used

| Material | Description |
| --- | --- |
| Aspun ™ 6806 | A low density polyethylene, melt index 105 g/10 min., available from Dow Chemical Company, Midland, Michigan. |
| Morthane ™ 440-200 | A polyurethane, melt index 25 g/10 min., available from Morton International, Seabrook, New Hampshire. |
| Substrate A | A multi-layer web as described in Example 1, below. |
| Substrate B | Warp Knit Nylon Cloth, Style #4246, 93.5 g/m$^2$, available from Alexander Fabrics, Libertyville, Illinois. |
| Substrate C | Miratec ™ 5609, 41 g/m$^2$ spunlaced polyethylene terephthalate, available from Polymer Group, Inc., Mooresville, North Carolina. |
| Substrate D | Millilock ™, 82 g/m$^2$ knitted loop, available from Milliken and Company, Spartanburg, South Carolina. |
| Substrate E | Fiberweb ™, 24 g/m$^2$ spunbond nonwoven polypropylene, available from BBA Nonwovens, Simpsonville, South Carolina. |
| Substrate F | Microporous polypropylene membrane available from Minnesota Mining and Manufacturing Company, St. Paul, Minnesota. |
| Substrate G | Orange construction paper. |
| Escorene ™ 3505 | A polypropylene, melt index 400 g/10 min., available from Exxon Chemical Company, Baytown, Texas. |

EXAMPLES 1 and 2

Examples 1 and 2 demonstrate using breathable elastic substrates and bi-directional stem configurations.

In Example 1, Substrate A, an elastic breathable substrate, was first made as follows. A blown micro-fiber pressure sensitive adhesive (BMF-PSA) web made of HL-8156 block copolymer pressure sensitive adhesive ITSA) (HB Fuller Company, St. Paul, Minn.) was prepared by processing the solid adhesive through a grid melt system (J&M Laboratories, Inc. Dawsonville, Ga.) and then through a 30.5-cm wide blown microfiber (BMF) die at a rate of 2.0 kg/hr. The grid melt system had a hopper holding capacity of 40 kg and a melting capacity of 40 kg/hr. The melt pump volume was 1.68 cc/rev and the process temperature was 135° C. The BMF-PSA was discharged from a melt blowing die having circular smooth surface orifices (8/cm) positioned approximately 10 cm above a vertical nip point formed by two 40.6-cm wide silicone coated rolls.

A layer of polypropylene spunbond nonwoven material (15 g/m$^2$ base weight, Product No. 150A0299A, First Quality Products, Inc., McElhattan, Pa.) was fed around the bottom roller of the nip up-stream of the BMF die. At the same time, a second layer of polypropylene spunbond nonwoven material (Product No. 150A0299A), a weft-inserted polyester scrim (Product No. 924864, Milliken Company, Spartanburg, S.C.), and a layer of 280 denier Glospanrh elastic filaments (Globe Manufacturing Company, Gastonia, N.C.) were fed around the top roller of the nip from the "down-stream" side of the BMF die. The polyester scrim had 18×40 denier yarns/2.5 cm in the machine direction and 9×15 denier yarns/2.5 cm in the cross-web direction.

The elastic filaments had a cross-web density of 2.75 filaments/cm and a stretch ratio of 2:1. The filaments were situated on top of the nonwoven layer so that the BMF-PSA was blown onto the "up-stream" layer of nonwoven and then contacted the elastic filaments to bond the entire composite together. The nip force was 418N across a 30.5-cm wide composite and the nip speed was 9.1 m/min. After passing through the nip, the substrate construction was nonwoven/BMF-PSA/elastic filaments/nonwoven with a first side near the BMF inner layer and a second side near the elastic filament layer. Upon exiting the nip, the substrate was allowed to relax, thereby causing the filaments to contract. It was observed that the low basewight nonwoven outer layers ("coverwebs") and the flexible BNF-PSA fibers were easily buckled into soft pleats. The resulting shirred elastic substrate was collected on a cardboard roll.

A stem formable material, Aspun™ 6806, was passed through the grid melt system at a rate of 0.5 kg/hr and then through a 30.5-cm wide die having 16 bead tip nozzles. The bead tip nozzles had a circular exit diameter of 1.5 mm and were pneumatically pulsed at a frequency of 5 pulses per second. The melt pump volume was 1.68 cc/rev and the process temperature was 205° C. The molten Aspun 6806 material was discharged from the die directly onto Substrate A in spots. The web was then conveyed approximately 20 cm into a vertical nip formed by two 40.6-cm wide silicone coated rolls at a speed of 4.6 m/min. The nip force was 1.7 kN across a 30.5 cm wide web. The first roll had a tooled surface that contained cavities with diameters of about 0.25 mm, depths in excess of about 0.80 mm and spacing of about 0.635 mm, resulting in a stem array having a stem density of about 248 stems/cm$^2$ (about 1600 stems/in). The cavities were angled at 45 degrees from the tangent of the roll surface in alternating directions. The second roll had a smooth surface. The layer of elastic Substrate A described above was fed around the smooth roll of the nip with the second side facing the surface of the smooth roll. The spots or discrete regions of stem-formable material faced the tooled surface and contacted the substrate as it entered the nip. The resulting web was removed from the tooled surface to yield a stem-surfaced web with rod-like stem projections on the regions of stem formable material, each stem having a diameter of approximately 0.25 mm and a height of about 0.6 mm, extending from the surface of the web. The stems were in rows that were either +45 degrees or −45 degrees from normal in the plane normal to the web surface and parallel to the cross-section of the web in the down-web direction. Each region had a somewhat circular shape and an area of between 0.2 and 0.3 cm$^2$ and contained between 50 and 75 stems. Each region was separated from neighboring regions by between approximately 1.0 and 1.5 cm.

The stem-surfaced web was breathable (ie. porous) and elastic. When wrapped around an object in either direction, and fastened by pressing both sides together, the web had a cinching action suitable as a compression wrapping construction. Patches of hooks or stems have a more rigid base than stems or hooks positioned on an elastic substrate and can engage better with loops.

Example 2 was made as Example 1 except the BMF-PSA in the substrate was pumped through the grid melt system at a flow rate of 4.0 kg/hr and the polyester scrim was not included in the construction. The resulting laminate exhibited some cohesion and the resulting stem-surfaced web had substantially no lateral slippage when wrapped around an object and fastened to itself.

EXAMPLES 3–5

Examples 3–5 demonstrate constructions having alternate shapes of stem regions. Examples 3–5 have stem regions that are continuous in the cross-web direction and are substantially perpendicular to the down-web direction of the web.

Example 3 was made in a manner similar to Example 1 and with the same substrate as Example 1. However, the stem formable material was deposited using a small orifice die tip with a single row of circular smooth surface orifices (8/cm) rather than bead tip nozzles. The small orifice die tip had circular smooth surface orifices (8/cm) with 0.51 mm diameter. The stem formable material was deposited at a rate of 0.7 kg/hr.

The resulting stem-surfaced regions were cross direction stripes approximately 0.5 cm wide and separated approximately 2 cm from each other. Each region had on average approximately 8 stems across its width and 16 rows/cm cross web. The webs were very ductile and breathable, and fastened to themselves when wrapped in either direction around an object.

Example 4 was made as Example 3 except a slot tip with a gap of 0.25 mm was used in place of the multiple orifice die tip and the flowrate of the stem formable material was 0.8 kg/hr. The resulting stem-surfaced regions were cross direction stripes approximately 0.6 cm wide and separated approximately 2 cm from from the nearest neighboring stemmed regions. The webs were very ductile and breathable, and fastened to themselves when wrapped in either direction around an object.

Example 5 was made as Example 3 except a traversing bead tip nozzle was used in place of the intermittent stationary die tip. The stem formable material was deposited at 1.8 kg/hr and traversed cross web at a frequency of 6 stripes per second. The substrate was moving at a speed of 9.1 m/min. The resulting stem-surfaced regions were cross-web direction stripes approximately 0.3 cm wide and separated approximately 1.5 to 2.0 cm from each other. The webs were very ductile and breathable, and fastened to themselves when wrapped in either direction around an object.

EXAMPLE 6

Example 6 demonstrated a construction having an inelastic substrate and another process of making discrete regions of stem formable material.

A stem formable material, Monthane™ 440, was passed through a glue gun (available as PAM 600 Spraymatic™ from Fastening Technology, Inc, Charlotte, N.C.). The circular exit of the glue gun was approximately 1.5 mm diameter and the process temperature was about 232° C. The molten material was discharged from the gun in discrete amounts as the gun was repeatedly triggered on and off at a frequency of 1.0 pulse per second. The discrete amounts or spots of material were deposited directly onto Substrate B. The web was then conveyed approximately 20 cm into a vertical nip point formed by two 40.6-cm wide silicone coated rolls at a speed of 4.6 m/min. The nip force was 1.7 kN across a 30.5 cm wide web. The first roll had a tooled surface that contained cavities with diameters of about 0.25 mm, depths in excess of about 0.80 mm and spacing of about 0.635 mm, resulting in a stem array having a stem density of about 248 stems/cm$^2$ (about 1600 stems/in$^2$). The cavities were angled at 45 degrees from the tangent to the roll surface in the machine direction and were tilted in alternating directions in every other row. The second roll had a smooth surface.

Substrate B was fed around the smooth roller of the nip with the second side facing the surface of the smooth roll. The stem formable material faced the tooled surface and contacted the substrate as it entered the nip. The resulting web was removed from the tooled surface to form a stem-surfaced web with rod-like stem projections on the regions of stem formable material, each stem having a diameter of approximately 0.25 mm and a height of about 0.6 mm, extending from the surface of the film. The stems were in rows that were either +45 degrees or −45 degrees from vertical in the plane vertical to the web surface and parallel to the cross-section of the web in the down-web direction. Each region had a somewhat circular shape and an area of between 1.0 and 1.5 cm$^2$ and contained between approximately 240 and 370 stems. Each region was separated from neighboring regions by between approximately 4 and 5 cm. The stem-surfaced web was breathable and flexible.

EXAMPLE 7–11

Examples 7–11 demonstrate construction having various inelastic substrates that were both substantially and substantially non-breathable.

Example 7 was made in a manner similar to Example 1 except the substrate was changed and a different die tip was used. The substrate was Substrate C, an inelastic nonwoven web, and the die tip was a small orifice die tip used in Example 3. The resulting stem-surfaced web had stem regions similar to those described in Example 3. The stem-surfaced web was breathable, flexible, and able to fasten onto itself in either direction of wrap.

In Example 8, the discrete stem-surfaced film was made as in Example 7 except the substrate was Substrate D. The stem-surfaced web was breathable, flexible, and able to fasten onto itself in either direction of wrap.

Example 9 was made in a manner similar to Example 1 except the materials were different and the tooled surface was changed. The substrate was Substrate E, spunbond polypropylene, and the stem formable material was Escorene™ 3505. The tooled surface contained cavities with diameters of about 280 micrometers (11 mils), depths in excess of about 2.5 mm (100 mils) and spacing of about 813 micrometers (32 mils), resulting in a stem array having a stern density of about 140 stems/cm$^2$ (900 stems/in$^2$). The cavities were perpendicular to the tangent of the roll surface. The second roll had a smooth surface. The layer of Substrate E was fed around the smooth roller of the nip with the second side facing the surface of the smooth roll. The discrete regions of stem-formable material faced the tooled surface and contacted the substrate as it entered the nip. The resulting web was removed from the tooled surface to yield a stem-surfaced web with rod-like stem projections on the regions of stem formable material, each having a diameter of approximately 0.3 mm and a height of about 0.7 mm, extending from the surface of the web. Caps were formed on the stems of the stem-surfaced web by exposing the stemed surface to a roll heated to 138° C. (280° F.). The stem-surfaced web was breathable, flexible, and able to fasten onto itself.

Example 10 was made in a manner similar to Example 9 except the substrate was Substrate F, a microporous membrane, and the stems were not subsequently capped. The stem-surfaced web was less breathable and less flexible than Example 9.

Example 11 was made in a manner similar to Example 9 except the substrate was Substrate G, paper, and the stems were not subsequently capped. The stem-surfaced web was less breathable and less flexible than Example 10.

EXAMPLE 12

Example 12 demonstrates another method of making discrete regions.

Stem-formable material, Dowlex™ 3445 polypropylene, was fed into a single screw extruder having a diameter of about 32 mm (1.25 inch), an L/D of 24/1, a screw speed of 15 rpm and a temperature profile that rose up to approximately 215° C. The thermoplastic Dowlex 3445 material was passed through the extruder and continuously discharged at a pressure of at least 0.7 MPa (100 psi) through a heated neck tube and into one port in a three-layer adjustable vane feed block (CLOEREN™ Model 86-120-398, available from Cloeren Incorporated of Orange, Tex., and setup for two layers) that was mounted on a 25.4 cm (14 in) wide film die (CLOEREN™ EBR III 96-151 also available from Cloeren Co.). An elastic material, Vector™ 411, was fed into a second single screw extruder having a diameter of about 64 mm (2.5 in), an L/D of 24/1, a screw speed of 5 rpm and a temperature profile that steadily increased to approximately 215° C. The elastic material was then continuously discharged at a pressure of at least about 1.4 MPa (200 psi) through a heated neck tube and into a second port in the three-layer feed block. The feed block and die were set at approximately 215° C. The die gap was set at approximately 0.5 mm (20 mils). The two layer molten construction was discharged from the die and drop fed at about 1.5 m/min (5 fpm) into a nip formed by two rolls having a nip pressure of about 0.2 KPa (30 psi). The first roll had a tooled surface that was heated to 55° C. and contained cavities with diameters of about 280 micrometers (11 mils), depths in excess of about 2.5 mm (100 mils) and spacing of about 813 micrometers (32 mils), resulting in a stem array having a stem density of about 140 stems/cm$^2$ (900 stems/in$^2$). A mask in the form of a Teflon™ netting having square diamond shaped openings of 7×7 mm, was placed over the tooled surface such as to cover some of the holes in a screen pattern. The second roll had a chrome-plated surface that was also heated to 55° C. The thermoplastic material of the construction faced the tooled surface and the elastic layer faced the chrome surface. The resulting cast film was removed from the tooled surface to form a stem-surfaced film with diamond shaped regions with rod-like stem projections, each having a diameter of approximately 300 micrometers and a height of about 700 micrometers, extending from the surface of the film. Each region was separated by an indentation.

When the stem-surfaced film thus produced was stretched, the diamond-shaped regions separated from each other as the stem-formable material broke (fractured) where the indentations were. The resulting film became elastic.

EXAMPLE 13

Example 13 demonstrates another method of making discrete regions.

Stem-formable material, Dowlex™ 3445, was fed into a single screw extruder equipped with a die having curved lip and a 6.3 mm (0.25 in) diameter opening, from which molten material was discharged. The material dropped into a flying cutter device. The device had a metal rod with a diameter of 12.5 mm (0.5"in) and an attached stainless steel blade attached along the shaft at one end with two screws. The blade extended outward from the rod perpendicular to the surface of the rod and parallel to the long axis of the rod. The shaft was rotated along its long axis by a motor at about 700 revolutions per minute. As the blade rotated, it deflected against the lip of the die, scraping a piece of the molten material. When the blade cleared the die, the blade sprang and threw the molten material onto a moving substrate, Substrate G passing into a nip arrangement described in Example 1. The web carried molten material, spots of approximately 3 mm in diameter, into the nip with the spots of polypropylene material next to the tooled surface. Nip pressure forced the molten material into the holes of the tooled surface, where it solidified. At the same time polymer melt entangled with the fibrous surface of the web, forming effective bonding.

The resulting stem-surfaced film is breathable and flexible.

What is claimed is:

1. A method of making a web material having a plurality of stems extending from discrete regions of the web, the method comprising:
   providing a web comprising a first major surface and a second major surface;
   providing a plurality of discrete quantities of a polymeric material on the first major surface of the web at a temperature above its softening point, wherein a plurality of discrete polymeric regions are formed on only the first major surface of the web, and wherein each discrete polymeric region of the plurality of discrete isomeric regions comprises a discrete patch surrounded on all sides by the first major surface of the web; and
   forming a plurality of stems in each discrete polymeric region of the plurality of discrete polymeric regions on the first major surface of the web.

2. The method according to claim 1, wherein the discrete quantities of polymeric material are provided by extruding molten polymer in a form selected from intermittent quantities.

3. The method according to claim 1, wherein the discrete quantities of polymeric material are provided by one or more rotating cutting blades positioned intermediate a source of polymeric material and the web, wherein the cutting blades cut the polymeric material into discrete quantities.

4. The method according to claim 1, further comprising deformation of the stems with a heated surface to produce an enlarged end on the stems.

5. The method of claim 1, wherein the plurality of discrete polymeric regions are separated by inter-regions revealing exposed portions of a first major surface of the web.

6. The method of claim 1, wherein the web comprises loop structures adapted to lock with the plurality of stems.

7. The method of claim 1, wherein the web comprises an elastic web.

8. The method of claim 1, wherein the plurality of discrete polymeric regions comprises a plurality of stripes extending over a first major side of the web.

9. The method of claim 1, wherein the plurality of discrete polymeric regions covers between 20 and 80 percent of a first major side of the web.

10. The method of claim 1, wherein the plurality of discrete polymeric regions covers between 5 and 25 percent of a first major side of the web.

11. The method of claim 1, wherein each stem of the plurality of stems comprises a hook.

12. The method of claim 1, wherein the web defines a localized plane, and wherein the plurality of stems are oriented at an angle that is not normal to the localized plane.

13. The method of claim 1, wherein the web defines a localized plane, and wherein the plurality of stems are oriented at an angle that is not normal to the localized plane, and further wherein the plurality of stems are angled in multiple directions.

14. The method of claim 1, wherein forming a plurality of stems in each discrete polymeric region of the plurality of discrete polymeric regions comprises forcing the polymeric material of the plurality of polymeric regions against a tool comprising a plurality of angled holes, wherein the plurality of stems are oriented at an angle that is not normal to a localized plane defined by the web.

15. The method of claim 1, further comprising cooling the discrete quantities of the polymeric material to a non-molten plate after forming the plurality of stems.

16. The method according to claim 1, wherein each stem of the plurality of stems comprises an end spaced away from the first major surface of the web.

17. The method according to claim 1, wherein the plurality of discrete polymeric regions comprise all of the discrete polymeric regions on the first major surface of the web.

18. A method of making a web construction comprising a plurality of stems distributed in discrete regions on the web construction, the method comprising:
providing a web construction comprising a continuous or substantially continuous layer of polymeric material on an elastic substrate, wherein the polymeric material is at a temperature above its softening point;
providing a tool comprising a plurality of stem-forming holes formed in a surface of the tool, wherein the plurality of stem-forming holes are arranged in a plurality of discrete regions on the surface of the tool;
pressing the layer of polymeric material against the surface of the tool, wherein a portion of the polymeric material enters the stem-forming holes;
separating the layer of polymeric material from the surface of the tool, wherein a plurality of stems are distributed in a plurality of discrete regions on the web construction; and stretching the elastic substrate after separating the layer of polymeric material from the surface of the tool, wherein the layer of polymeric material fractures.

19. The method of claim 18, further comprising
forming indentations in the layer of polymeric material between the plurality of discrete regions of stems,
wherein the layer of polymeric material fractures along the indentations.

20. The method of claim 18, wherein the plurality of discrete regions of stem-forming holes are formed by masking a portion of the surface of the tool.

21. The method of claim 18, further comprising deforming of the plurality of stems with a heated surface.

22. The method of claim 18, wherein between 5 and 25 percent of the surface of the tool is occupied by the plurality of discrete regions of stem-forming holes.

23. The method of claim 18, wherein the web construction defines a localized plane, and wherein the plurality of stems are oriented at an angle that is not normal to the localized plane.

24. The method of claim 18, wherein the web construction defines a localized plane, and wherein the plurality of stems are oriented at an angle that is not normal to the localized plane, and further wherein the plurality of stems are angled in multiple directions.

25. The method of claim 18, wherein the plurality of stem-forming holes are angled such that the plurality of stems are oriented at an angle that is not normal to a localized plane defined by the web construction.

26. A method of manufacturing a mechanical fastener, the method comprising:
providing at least one discrete quantity of polymeric material on a fibrous major surface of a nonwoven web, wherein the at least one discrete quantity of polymeric material forms at least one discrete polymeric region entangled with the fibrous major surface, and wherein the at least one discrete polymeric region is surrounded by the fibrous major surface of the nonwoven web; and
forming a plurality of stems in the at least one discrete polymeric region.

27. The method according to claim 26, further comprising simultaneously pressing the at least one discrete quantity of polymeric material against the fibrous major surface of the nonwoven web while forming the plurality of stems.

28. The method according to claim 26, further comprising deforming the plurality of stems to produce an enlarged end on each stem of the plurality of stems.

29. A method of making a mechanical fastener, the method comprising:
providing a substrate comprising a fibrous first major surface and a second major surface;
providing a plurality of discrete quantities of a polymeric material on the fibrous first major surface of the substrate at a temperature above its softening point, wherein a plurality of discrete polymeric regions are formed on only the first major surface of the substrate, wherein the plurality of discrete polymeric regions are not located on the second major surface of the substrate, and wherein the plurality of discrete polymeric regions are entangled with the fibrous first major surface of the substrate, and further wherein the plurality of discrete polymeric regions comprises a plurality of discrete patches, wherein each discrete patch is surrounded on all sides by the first major surface of the substrate; and
forming a plurality of stems in each discrete polymeric region of the plurality of discrete polymeric regions on the fibrous first major surface of the substrate.

30. The method according to claim 29, wherein providing the plurality of discrete polymeric regions on the first major surface of the substrate comprises depositing the plurality of discrete polymeric regions on only the first major surface of the substrate.

31. The method according to claim 29, wherein forming the plurality of stems in each discrete polymeric region and entangling the discrete polymeric regions with the fibrous first major surface of the substrate comprises pressing each discrete quantity of polymeric material against the fibrous first major surface of the web while forming the plurality of stems.

32. The method according to claim 29, further comprising deforming the plurality of stems to produce an enlarged end on each stem of the plurality of stems.

33. The method according to claim 29, wherein the plurality of discrete patches comprise all of the discrete patches on the first major surface of the substrate.

34. A method of making a web material having a plurality of stems extending from discrete regions of the web, the method comprising:

provliding a web comprising a fibrous first major surface and a second major surface;

depositing a plurality of discrete quantities of a polymeric material on only the fibrous first major surface of the web at a temperature above its softening point, wherein a plurality of discrete polymeric regions are formed on only the fibrous first major surface of the web, wherein each discrete polymeric region of the plurality of discrete polymeric regions comprises a discrete patch surrounded on all sides by the fibrous first major surface of the web, and wherein the plurality of discrete polymeric regions are entangled with the fibrous first major surface of the web; and forming a plurality of stems in each discrete polymeric region of the plurality of discrete polymeric regions on the fibrous first major surface of the web, wherein each stem of the plurality of stems comprises an end spaced away from the fibrous first major surface of the web.

35. The method according to claim 34, wherein the plurality of discrete polymeric regions comprise all of the discrete polymeric regions on the first major surface of the web.

36. A method of manufacturing a mechanical fastener, the method comprising:

providing at least one discrete quantity of polymeric material on a fibrous major surface of a nonwoven web, wherein the at least one discrete quantity of polymeric material forms at least one discrete polymeric region entangled with the fibrous major surface, wherein the at least one discrete polymeric region comprises a plurality of discrete patches on the fibrous major surface of the nonwoven web; and forming a plurality of stems in the at least one discrete polymeric region.

37. The method according to claim 36, further comprising simultaneously pressing the at least one discrete quantity of polymeric material against the fibrous major surface of the nonwoven web while forming the plurality of stems.

38. The method according to claim 36, wherein the at least one discrete polymeric region is surrounded by the fibrous major surface of the nonwoven web.

39. The method according to claim 36, further comprising deforming the plurality of stems to produce an enlarged end on each stem of the plurality of stems.

40. The method according to claim 36, wherein the plurality of discrete patches comprise all of the discrete patches on the fibrous major surface of the nonwoven web.

* * * * *

UNITED STATES PATENT AND TRADEMARK OFFICE
CERTIFICATE OF CORRECTION

PATENT NO. : 6,962,635 B2
DATED : November 8, 2005
INVENTOR(S) : Tuman, Scott J.

It is certified that error appears in the above-identified patent and that said Letters Patent is hereby corrected as shown below:

Column 2,
Line 5, after "membrane" delete "," and insert -- ; --.
Line 20, after "web" delete "," and insert -- ; --.

Column 5,
Line 23, delete "clinched" and insert -- cinched --.

Column 6,
Line 44, delete "toot" and insert -- tool --.

Column 7,
Line 3, delete "clinched" and insert -- cinched --.
Line 8, after "functionality" insert -- ( --.

Column 8,
Line 4, delete "ITSA)" and insert -- (PSA) --.
Line 24, delete "Glospanrh" and insert -- Glospan$^{TM}$ --.
Line 43, delete "BNF-PSA" and insert -- BMF-PSA --.
Line 61, delete "stems/in)." and insert -- stems/in$^2$). --.

Column 10,
Line 9, delete "Monthane$^{TM}$" and insert -- Morthane$^{TM}$ --.

Column 11,
Line 6, before "density" delete "stern" and insert -- stem --.
Line 48, delete "411" and insert -- 4111 --.

UNITED STATES PATENT AND TRADEMARK OFFICE
CERTIFICATE OF CORRECTION

PATENT NO. : 6,962,635 B2
DATED : November 8, 2005
INVENTOR(S) : Tuman, Scott J.

It is certified that error appears in the above-identified patent and that said Letters Patent is hereby corrected as shown below:

<u>Column 12,</u>
Line 57, delete "isomeric" and insert -- polymeric --.

<u>Column 13,</u>
Line 42, delete "plate" and insert -- state --.

Signed and Sealed this

Sixteenth Day of May, 2006

JON W. DUDAS
*Director of the United States Patent and Trademark Office*